Dec. 30, 1952     A. A. GEIS     2,623,435
ADJUSTABLE AUTOMOBILE MIRROR TRAY
Filed Oct. 17, 1950
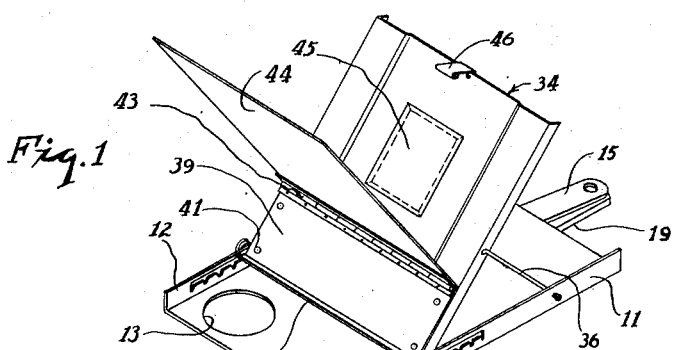
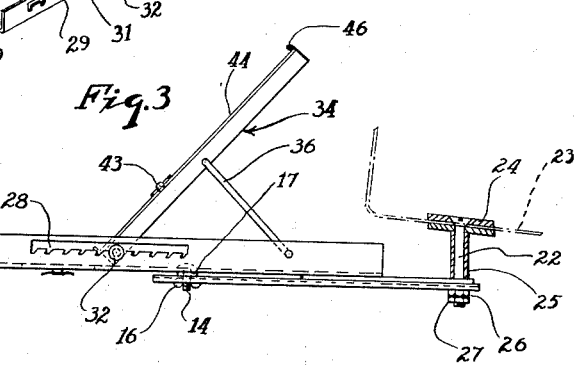
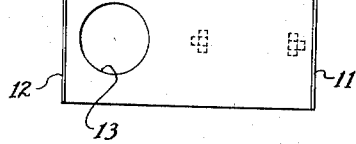
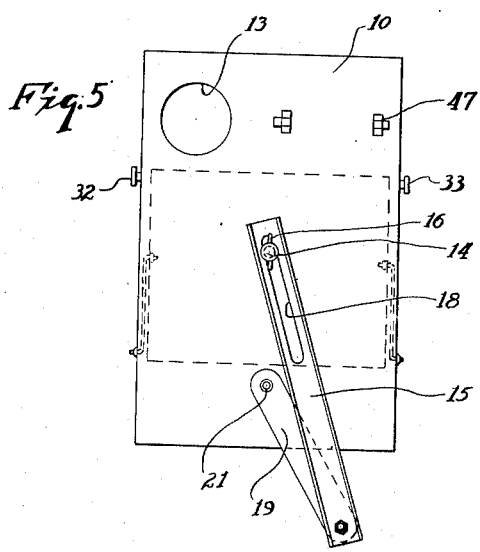
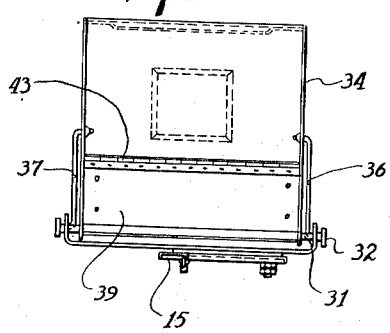
INVENTOR.
ARVINE A. GEIS
BY
L. S. Saulsbury
ATTY.

Patented Dec. 30, 1952

2,623,435

UNITED STATES PATENT OFFICE 2,623,435

ADJUSTABLE AUTOMOBILE MIRROR TRAY

Arvine A. Geis, Massilon, Ohio

Application October 17, 1950, Serial No. 190,530

2 Claims. (Cl. 88—93)

This invention relates to an automobile tray.

It is an object of the present invention to provide an automobile mirror tray which is adapted to be secured to the dash of an automobile and which is adjustable under the same when not in use.

It is another object of the invention to provide in an automobile mirror tray an adjustable support member which can be lifted from the tray to serve as a support for maps and the like and which may have a mirror which can be used by one sitting on the front seat of the car and wherein the adjustable part can be retained in any number of adjusted positions for the best accommodation of the different individuals.

Other objects of the present invention are to provide an automobile tray of this type which is of simple construction, inexpensive to manufacture, easy to install upon the automobile, easy to be adjusted between positions of use and non-use, compact, has a minimum number of parts, sturdy and efficient in operation.

For other objects and for a better understanding of the invention, reference may be had to the following detailed description taken in connection with the accompanying drawing, in which:

Fig. 1 is a perspective view of the automobile tray in an extended position with the rest elevated.

Fig. 2 is a top plan view of the tray with the rest elevated.

Fig. 3 is a side elevational view of the tray with the rest elevated and showing the attachment means for connecting the tray to the bottom of the dashboard.

Fig. 4 is an end elevational view of the tray.

Fig. 5 is a bottom plan view of the tray and the attaching arms extending therefrom.

Referring now to the figures, 10 represents a main plate having upwardly extending side flanges 11 and 12. The ends of this plate 10 are open and in one corner thereof is an opening 13 adapted to receive a tumbler. Depending from the bottom face of the main tray plate 10 is a bolt 14 by which a slidable supporting arm 15 of channel section is secured when a wing nut 16 is tightened upon the bolt 14. The upper face of the arm 15 may bear against a washer 17 on the bolt 14. The arm 15 has an elongated slot 18 through which the bolt 14 extends.

A second arm 19 is pivotally connected at 21 to the under face of the main tray part or plate 10 and its inner end is joined with the inner end of the arm 15 for connection by means of a pivot bolt 22 with the bottom of a dash 23. The bolt extends downwardly through a plate 24 on the inner side of the dash bottom and through a spacing sleeve 25. The ends of the arms 15 and 19 abut the lower end of the spacing sleeve 25 and are held thereagainst by nuts 26 and 27 threaded on the bolt and locked with each other.

In each of the upstanding flanges 11 and 12 of the main tray part 10 is a slot 28 having a plurality of spaced notches 29 extending along its lower edge and into which a rod 31 having handles 32 and 33 on its opposite ends, may be dropped. This rod extends through the lower end of an adjustable rest 34 which may be held in an inclined fashion by pivot arms 36 and 37 pivotally connected upon the sides of the rest 34 and respectively pivotally connected to the flanges 11 and 12. As the rod 31 is moved to the different notches 29, the rest 34 can pivot on the arms 36 and 37 into the proper inclined position. This rest 24 can be dropped and lowered onto the main tray part 10.

The rest 34 has a plate 39 secured to its upper face by rivets 41 and a flange 42 extends from the bottom edge to serve as a rest for a book, map or any other object which one may desire to view when the tray has been extended from under the dash. A piano hinge 43 secures a top cover 44 to the upper edge of plate 39 and which, when brought forward, exposes a mirror 45 on the rest 34. This hinged plate 44 is held closed upon the rest by a spring catch 46.

At times when the tray is to be used for supporting food, the rest assembly 34 can be dropped onto the main tray part 10. The tray can be swung upon its arms under the dashboard when not in use and after the rest assembly 34 has been dropped.

While various changes may be made in the detail construction, it shall be understood that such changes shall be within the spirit and scope of the present invention as defined by the appended claims.

What is claimed is:

1. An automobile tray comprising a main tray part, arm means connected to the under side of the main tray part and having attaching means on their inner ends adapted for the attachment of the tray to the bottom of an automobile dashboard, an adjustable rest assembly adapted to carry a mirror and connected to the upper side of the main tray part and adapted to be collapsed thereupon for the purpose of moving the tray beneath the bottom of the dashboard, supporting means for connecting said rest assembly on the main tray part, said tray part having upwardly extending flanges, notch means in each of the flanges, said rest assembly having a rod engageable with the notch means and said rod extending through and across the under side of the assembly, and pivot arms pivotally connected between the assembly and the flanges of the main tray part.

2. An automobile tray comprising a main tray part, arm means connected to the under side of the main tray part and having attaching means on their inner ends adapted for the attachment of the tray to the bottom of an automobile dashboard, an adjustable rest assembly connected to the upper side of the main tray part and adapted to be collapsed thereupon for the purpose of moving the tray beneath the bottom of the dashboard, supporting means for connecting said rest assembly on the main tray part, said rest assembly including a main part having a mirror thereon, a plate secured to the top of the main part, a ledge secured to the lower side of the plate, a cover hingedly connected to the upper edge of the plate and adapted to be closed over the mirror and a latch at the upper edge of the main rest part for holding the cover closed on the main rest part and over the mirror.

ARVINE A. GEIS.

REFERENCES CITED

The following references are of record in the file of this patent:

UNITED STATES PATENTS

| Number | Name | Date |
|---|---|---|
| 1,221,643 | Wood | Apr. 3, 1917 |
| 1,498,658 | Ibach | June 24, 1924 |
| 1,499,361 | Freund | July 1, 1924 |
| 1,819,516 | Kelly | Aug. 18, 1931 |
| 1,864,943 | Riddle | June 28, 1932 |
| 1,999,476 | Pollock | Apr. 30, 1935 |
| 2,066,982 | Kronquist | Jan. 5, 1937 |
| 2,067,602 | Dorfman | Jan. 12, 1937 |

FOREIGN PATENTS

| Number | Country | Date |
|---|---|---|
| 358,386 | Italy | Apr. 14, 1938 |